(12) United States Patent
Zhao et al.

(10) Patent No.: US 9,924,144 B2
(45) Date of Patent: Mar. 20, 2018

(54) LIGHT FIELD ILLUMINATING METHOD, DEVICE AND SYSTEM

(71) Applicant: BEIHANG UNIVERSITY, Beijing (CN)

(72) Inventors: Qinping Zhao, Beijing (CN); Zhong Zhou, Beijing (CN); Tao Yu, Beijing (CN); Chang Xing, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 107 days.

(21) Appl. No.: 15/007,062

(22) Filed: Jan. 26, 2016

(65) Prior Publication Data

US 2017/0134701 A1    May 11, 2017

(30) Foreign Application Priority Data

Nov. 11, 2015   (CN) .......................... 2015 1 0765017

(51) Int. Cl.
*H04N 9/31* (2006.01)
*G03B 21/14* (2006.01)

(52) U.S. Cl.
CPC ........... *H04N 9/3155* (2013.01); *H04N 9/317* (2013.01); *H04N 9/3185* (2013.01); *G03B 21/14* (2013.01); *H04N 9/3194* (2013.01)

(58) Field of Classification Search
CPC .... H04N 9/3155; H04N 9/317; H04N 9/3194; H04N 9/3182; H04N 9/3185; G03B 21/14; G03B 21/147; G03B 21/2053
See application file for complete search history.

(56) References Cited

U.S. PATENT DOCUMENTS

| 2005/0018295 A1* | 1/2005 | Mendlovic .............. G06E 3/005 359/558 |
| 2005/0280783 A1 | 12/2005 | Yamasaki et al. .............. 353/94 |
| 2012/0050606 A1 | 3/2012 | Debevec et al. .............. 348/370 |

FOREIGN PATENT DOCUMENTS

| CN | 102147931 A | 8/2011 |
| CN | 102314708 A | 1/2012 |
| CN | 103108452 A | 5/2013 |

OTHER PUBLICATIONS

Paul Debevec et al., "A lighting Reproduction Approach to live-Action Compositing" SIGGRAPH 2002 Conference Proceedings, USC Institute for Creative Technologies, Jul. 21-26, 2002.

(Continued)

*Primary Examiner* — Ryan Howard
(74) *Attorney, Agent, or Firm* — J.C. Patents (57) ABSTRACT

The invention provides a light field illuminating method, device and system. The method includes: determining, based on position and angle of rays emitted from a projector and focal length of a lens, position and angle of projection rays obtained after the emitted rays being transmitted through a lens array; determining, based on position and angle of projection rays and light probe array of sampled scene, brightness value of projection rays; converting, based on brightness transfer function of projector, brightness value of projection rays into pixel value of projection input image, generating projection input image based on pixel value of projected input image; and performing light field illumination on target object with projection input image. A projector and a lens array are adopted to achieve light field illumination, so that pixel-level accurate lighting control can be achieved, and various complicated light field environments can be simulated vividly in practical scenario.

13 Claims, 4 Drawing Sheets

(56) References Cited

OTHER PUBLICATIONS

Yu Sheng et al., "A spatially Augmented Reality Sketching Interface for Architectural Daylighting Design" IEEE Transactions on visualization and Computer Graphics, vol. 17, No. 1, (Jan. 2011) pp. 38-50.
The Chinese First Examination Report of corresponding Chinese patent application No. 201510765017.0, dated Jun. 19, 2017.

* cited by examiner

FIG. 6

LIGHT FIELD ILLUMINATING METHOD, DEVICE AND SYSTEM

CROSS-REFERENCE TO RELATED APPLICATIONS

This application claims priority to Chinese Patent Application No. 201510765017.0, filed on Nov. 11, 2015, entitled "Light Field Illuminating Method, Device and System", which is incorporated herein by reference in its entirety.

TECHNICAL FIELD

The present invention relates to the lighting rendering field, and more particularly to a light field illuminating method, a device and a system.

BACKGROUND

In the fields such as film and television special effect making and stage lighting control, it is necessary to accurately control and recover lighting input images of a sampled scene, so as to obtain real and natural rendering effects when lighting rendering is performed on real objects under the sampled scene.

In the prior art, for example, a representative light field illuminating method is: in a lighting device, developed by Paul Debeve et al, University of Southern California, 156 full color light emitting diodes (Light Emitting Diode, LED) spotlights are mounted on a spherical support with a diameter of 2 m, the LED spotlights are directed to the center of the spherical support, and a scene mapping image is then used to drive all the LED spotlights, control colors and brightness thereof, to recover original lighting of the scene mapping image. In another illuminating method, developed by Yu Sheng et al, Rensselaer Polytechnic Institute, a projector is used as a direct light source, rendering images are projected on a real building model, to assist a building daylighting design.

However, when the LED spotlight acts as a light source, the control accuracy is low; when the projector acts as the light source, since the number of the used projectors is limited, only a limited number of dot light sources can be simulated, the accuracy of the light source is relatively low under a complicated spatially varied lighting scene.

SUMMARY

Embodiments of the present invention provide a light field illuminating method, so as to solve the problem of insufficient light source accuracy of the light field illuminating method in the prior art.

An embodiment of the present invention provides a light field illuminating method, including:

determining, based on a position and an angle of rays emitted from a projector as well as a focal length of a lens, a position and an angle of projection rays obtained after the emitted rays being transmitted through a lens array;

determining, based on the position and the angle of the projection rays as well as a light probe array of a sampled scene, a brightness value of the projection rays;

converting, based on a brightness transfer function of the projector, the brightness value of the projection rays into a pixel value of a projection input image, generating the projection input image based on the pixel value of the projection input image; and performing light field illumination on a target object with the projection input image.

In another embodiment, before determining, based on the position and the angle of the projection rays as well as the light probe array of the sampled scene, the brightness value of the projection rays, the method further includes:

determining, based on a light probe array of a set projection image, a position of a dot light source, where the dot light source is formed after the rays emitted from the projector being refocused through the lens; and correcting, based on the position of the dot light source, the position and the angle of the projection rays;

where the determining, based on the position and the angle of the projection rays as well as the light probe array of the sampled scene, the brightness value of the projection rays, includes:

determining, based on the corrected position and the corrected angle of the projection rays as well as the light probe array of the sampled scene, the brightness value of the projection rays.

In another embodiment, the correcting, based on the position of the dot light source, the position and the angle of the projection rays, includes:

determining the position and the angle of the projection rays based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ \frac{-1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

where, $x_p$ indicates the position of the rays emitted from the projector, $v_p$ indicates the angle of the rays emitted from the projector, $f_l$ indicates the focal length of the lens, h1 indicates a vertical ray transmission distance from the projector to the lens, h2 indicates a vertical ray transmission distance from the lens to a projection plane; z indicates the position of the dot light source, $x_1$ indicates the position of the projection rays of the projector, and $v_1$ indicates the angle of the projection rays of the projector.

In another embodiment, there are multiple projectors, and the method further includes: performing brightness mapping on projection input images and projection light field output of the multiple projectors, and determining that brightness of the projection rays output to the illuminating light field are consistent by generating the projection input images of the multiple projectors through the mapping.

In another embodiment, the method further includes: extracting image data of the target object obtained after performing the light field illumination on the target object with the projection input image, and merging the image data and image data of the sampled scene to obtain a lighting rendering result of the target object under the sampled scene.

An embodiment of the present invention provides a light field illuminating device, including:

a determining module, configured to determine, based on a position and an angle of rays emitted from a projector as well as a focal length of a lens, a position and an angle of projection rays obtained after the emitted rays being transmitted through a lens array;

where the determining module is further configured to determine, based on the position and the angle of the projection rays as well as a light probe array of a sampled scene, a brightness value of the projection rays;

a projection input image generating module, configured to convert, based on a brightness transfer function, the brightness value of the projection rays into a pixel value of a projection input image, and generate the projection input image based on the pixel value of the projection input image; and an illuminating module, configured to perform light field illumination on a target object with the projection input image.

In another embodiment, the determining module is further configured to determine, based on a light probe array of a set projection image, a position of a dot light source, where the dot light source is formed after the rays emitted from the projector being refocused through the lens;

the device further includes: a correcting module, configured to correct, based on the position of the dot light source, the position and the angle of the projection rays;

the determining module is specifically configured to determine, based on the corrected position and the corrected angle of the projection rays as well as the light probe array of the sampled scene, the brightness value of the projection rays.

In another embodiment, the determining module is specifically configured to determine the position and the angle of the projection rays based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ \frac{-1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

where, $x_p$ indicates the position of the rays emitted from the projector, $v_p$ indicates the angle of the rays emitted from the projector, $f_l$ indicates the focal length of the lens, h1 indicates a vertical ray transmission distance from the projector to the lens, h2 indicates a vertical ray transmission distance from the lens to a projection plane; z indicates the position of the dot light source, $x_l$ indicates the position of the projection rays of the projector, and $v_l$ indicates the angle of the projection rays of the projector.

In another embodiment, the device further includes:

a data extracting module, configured to extract illuminating data obtained after performing the light field illumination on the target object with the projection input image, and a merging module, configured to merge the illuminating data and image data of the sampled scene to obtain a lighting rendering result of the target object under the sampled scene.

An embodiment of the present invention further provides a light field illuminating system, including a projector, a lens array, and any one of the light field illuminating device described above.

In the light field illuminating method, the device and the system provided in embodiments of the present invention, the brightness value of the projection rays is determined based on the position and the angle of the projection rays as well as the light probe array of the sampled scene; the brightness value of the projection rays is converted into the pixel value of the projection input image based on the brightness transfer function of the projector, thereby generating the projection input image; and the light field illumination is performed on the target object with the projection input image. The present invention can achieve accurate lighting recovery of the sampled scene by collecting the light probe array of the sampled scene in combination with the position and the angle of the projection rays. And the projector and the lens array are adopted in the present invention to achieve light field illumination, so that pixel-level accurate lighting control can be achieved, and various complicated light field environments can be simulated vividly in practical scenario.

BRIEF DESCRIPTION OF DRAWINGS

In order to describe the technical solutions in embodiments of the present invention or in the prior art more clearly, drawings needed for describing the embodiments or the prior art will be briefly introduced below. Obviously, what are described in the following drawings are only some embodiments of the present invention and persons skilled in the art can obtain other embodiments according to the drawings without any creative effort.

DESCRIPTION OF EMBODIMENTS

In order to make the purposes, technical solutions and advantages of embodiments of the present invention clearer, the technical solutions in embodiments of the present invention will be clearly and comprehensively described hereinafter with reference to the drawings in embodiments of the present invention. Obviously, those described here are not all but only a part of embodiments of the present invention. On the basis of the embodiments of the present invention, all other embodiments obtained by persons skilled in the art without any creative effort should fall within the protection scope of the present invention.

Embodiments of the present invention provide a light field illuminating method, which is used to perform lighting rendering on real objects by means of recovered lighting of the sampled scene in the fields such as film and television special effect making and stage lighting control, so as to enhance a sense of realism for the rendered images.

Figure 1:
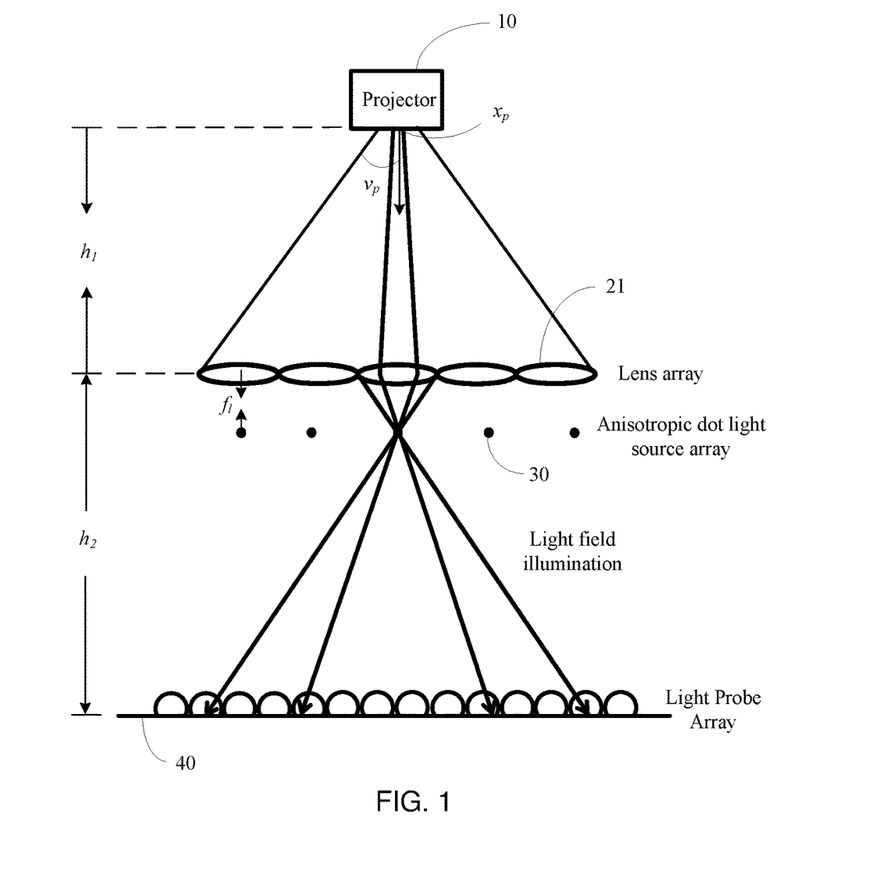
FIG. 1 is a schematic principle diagram of a light field illuminating method according to an embodiment of the present invention.

FIG. 1 is a schematic principle diagram of a light field illuminating method according to an embodiment of the present invention. Please refer to FIG. 1, a light field illuminating system in embodiments of the present invention is constructed by a projector 10 and a lens array formed by multiple lenses 21. The lens array can be set according to the range of an illuminating light field and the particular conditions of an illuminating scene, such as 20×20. Rays emitted from the projector 10 form a plurality of anisotropic dot light sources 30 after being re-converged through the lens array, and the plurality of anisotropic dot light sources 30 constitute a dot light source array having an arranging form consistent with the lens array. Projection rays formed through the dot light source array are projected to a light field illuminating area 40. Particularly, h1 indicates a distance between the projector 10 and the lens array, h2 indicates a distance between the lens array and the light field illuminating area 40. In the light field illuminating method according to an embodiment of the present invention, lighting data under a certain scene is collected, the lighting environment of the scene is recovered accurately within an illuminating range, then real objects are illuminated with the recovered illumination to obtain a lighting rendering result of the real objects. Since the projection rays emitted from the dot sources come from the projected images, then pixel-level accurate control on color and brightness of the projection rays of all the dot light sources at different angles can be achieved.

Hereinafter, the light field illuminating method according to embodiments of the present invention will be described in details with reference to the accompanying drawings.

Figure 2:
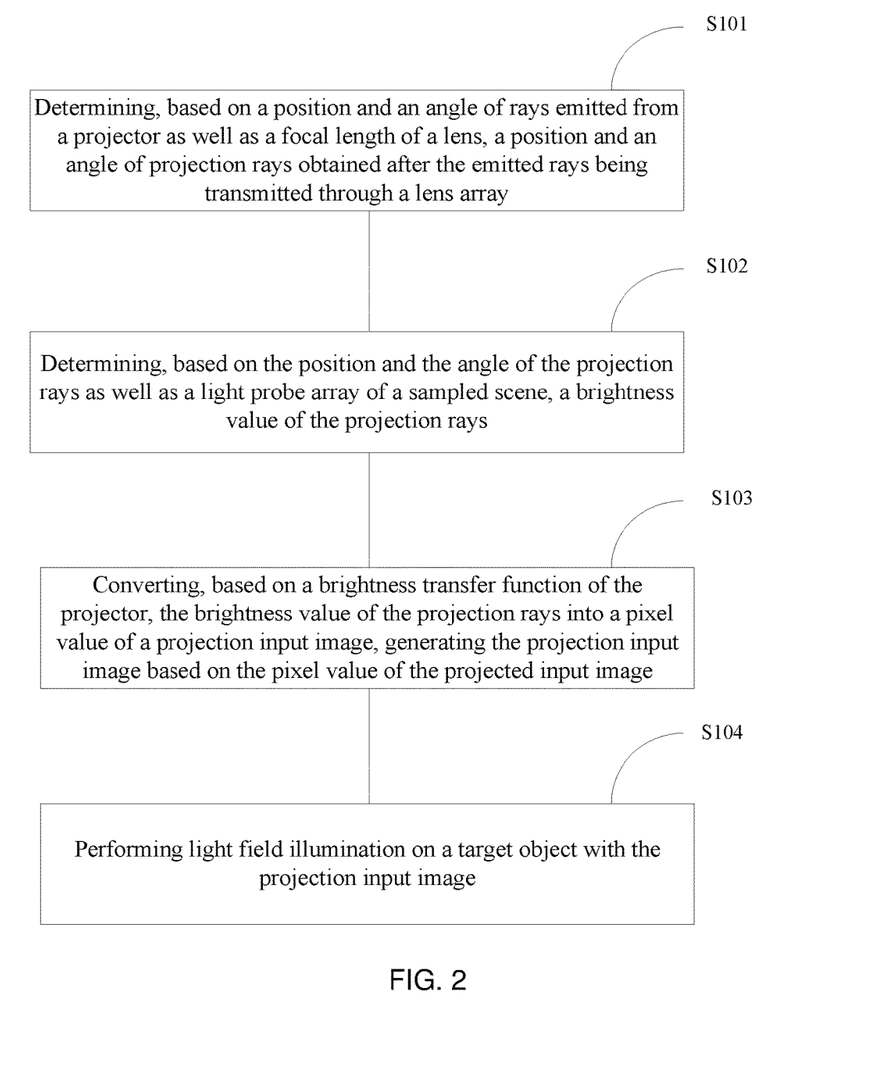
FIG. 2 is a schematic flowchart of a light field illuminating method according to an embodiment of the present invention.

FIG. 2 is a schematic flowchart of a light field illuminating method according to an embodiment of the present invention. Please refer to FIG. 2, the light field illuminating method provided by the embodiment of the present invention includes:

S101: Determining, based on a position and an angle of rays emitted from a projector as well as a focal length of a lens, a position and an angle of projection rays obtained after the emitted rays being transmitted through a lens array;

In particular, the position and the angle of the projection rays can be controlled accurately according to a ray transfer matrix, where the projection rays refer to rays arriving at the light field illuminating area after the rays emitted from the projector being transmitted through the lens array. The ray transfer matrix can be expressed as:

$$\begin{bmatrix} x_l \\ v_l \end{bmatrix} = \begin{bmatrix} 1 & h_1 \\ 0 & 1 \end{bmatrix} \begin{bmatrix} 1 & 0 \\ -\frac{1}{f_l} & 1 \end{bmatrix} \begin{bmatrix} 1 & h_2 \\ 0 & 1 \end{bmatrix} \begin{bmatrix} x_p \\ v_p \end{bmatrix}$$

where, $x_p$ indicates the position of the rays emitted from the projector, $v_p$ indicates the angle of the rays emitted from the projector, $f_l$ indicates the focal length of the lens, h1 indicates a vertical ray transmission distance from the projector to the lens, h2 indicates a vertical ray transmission distance from the lens to a projection plane; z indicates a position of the dot light source, $x_1$ indicates the position of the projection rays of the projector, and $v_1$ indicates the angle of the projection rays of the projector.

S102: Determining, based on the position and the angle of the projection rays as well as a light probe array of a sampled scene, a brightness value of the projection rays;

Select a sampled scene to be recovered according to lighting requirements, collect a light probe array of the sampled scene, and set the light probe array on the light field illuminating area correspondingly. Find the corresponding pixel of the light probe array according to the position and the angle of the projection rays, and determine the brightness value of the projection rays according to the pixel value of the light probe array.

S103: Converting, based on a brightness transfer function of the projector, the brightness value of the projection rays into a pixel value of a projection input image, generating the projection input image based on the pixel value of the projection input image;

The brightness transfer function is used to represent a relationship between the pixel value of the projection input image of the projector and output brightness, and usually obtained by fitting a curve after a discrete calibration. The brightness value of the projection rays can be converted, according to the brightness transfer function of the projector, into the pixel value of the projection input image which is used for light field illumination, and the projection input image can be generated according to the pixel value of the projection input image.

S104: Performing light field illumination on a target object with the projection input image.

In the light field illuminating method in the embodiment of the present invention, the brightness value of the projection rays is determined based on the position and the angle of the projection rays of the projector as well as the light probe array of the sampled scene; the brightness value of the projection rays is converted into the pixel value of the projection input image based on the brightness transfer function of the projector, thereby generating the projected input image; and the light field illumination is performed on the target object with the projection input image. The present invention can achieve accurate lighting recovery of the sampled scene by collecting the light probe array of the sampled scene in combination with the position and the angle of the projection rays. And the projector and the lens array are adopted in the present invention to achieve light field illumination, so that pixel-level accurate lighting control can be achieved, and various complicated light field environments can be simulated vividly in practical scenario.

Figure 3:
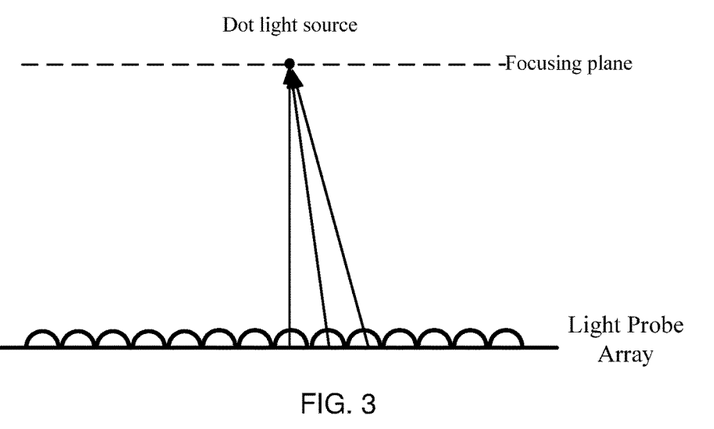
FIG. 3 is a principle diagram of a method for determining a position of a dot light source according to an embodiment of the present invention.

Further, in the process of determining the position and the angle of the projection rays, in order to eliminate the effects on the ray transfer matrix caused by model distortion and equipment error and guarantee the accuracy of the position and the angle of the projection rays, before determining, based on the position and the angle of the projection rays as well as the light probe array of the sampled scene, the brightness value of the projection rays, the method further includes:

S201: Determining, based on a light probe array of a set projection image, a position of a dot light source, where the dot light source is formed after the rays emitted from the projector being refocused through the lens;

FIG. 3 is a schematic principle diagram of a method for determining a position of a dot light source according to an embodiment of the present invention. Please refer to FIG. 3, in particular, the projector projects a set projection image to generate light field illumination, and collect the light probe array of the set image within the light field illuminating area to obtain a light probe array image containing bright dot array of the focused points. Based on a pixel position of the projection bright dot in the light probe array image and a spherical projection model of the light probe array, the projection bright dot is converted into projection rays in space. A spatial position of corresponding dot light source can be obtained by intersecting all the converted projection rays and a focusing plane where the dot light source is located. In particular, to facilitate to determine the pixel position of the projection bright dot in the light probe array, the set projection image can be a single-color image. Optionally, in order to guarantee the brightness of the projection bright dot, and facilitate to determine the pixel position of the projection bright dot in the light probe array, the set projection image can be a full white image.

S202: Correcting, based on the position of the dot light source, the position and the angle of the projection rays;

the determining, based on the position and the angle of the projection rays as well as the light probe array of the sampled scene, the brightness value of the projection rays, includes:

Determining, based on the corrected position and the corrected angle of the projection rays as well as the light probe array of the sampled scene, the brightness value of the projection rays.

In particular, the position and the angle of the projection rays are determined based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ \frac{-1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

where, $x_p$ indicates the position of the rays emitted from the projector, $v_p$ indicates the angle of the rays emitted from the projector, $f_1$ indicates the focal length of the lens, h1 indicates the vertical ray transmission distance from the projector to the lens, h2 indicates the vertical ray transmission distance from the lens to the projection plane; z indicates the position of the dot light source, $x_1$ indicates the position of the projection rays of the projector, and $v_1$ indicates the angle of the projection rays of the projector.

In the embodiment of the present invention, the spatial resolution of the four-dimensional light field consisting of the anisotropic dot light source array in this method is the number of the dot light sources, when one projector is used, the spatial resolution is equal to the resolution of the lens array, which is expressed by formula 2:

$$R_{spatial} = R_L \quad (2)$$

Where, $R_{spatial}$ is the spatial resolution of the four-dimensional light field, and RL is the resolution of the lens array. For example, the lens array consists of 20×20 lens, that is, the resolution of the lens array is 20×20. Seen from the formula, raising the resolution of the lens array is equivalent to raising the spatial resolution of the four-dimensional light field. In addition, increasing the number of projectors can increase the spatial resolution of the four-dimensional light field proportionally.

The angular resolution of the four-dimensional light field is the number of rays emitted from each dot light source, and expressed by formula 3:

$$R_{angular} = \frac{R_P}{R_L} \quad (3)$$

Where, Rangula is the angular resolution of the four-dimensional light field, RP is the resolution of the projector, and RL is the resolution of the lens array. Seen form the formula, raising the resolution of the projector or lowering the resolution of the lens array can raise the angular resolution of the four-dimensional light field. By means of customizing the lens array, and making choices of the number and resolution of projectors, spatial and angular resolution of the light field illuminating system can be controlled flexibly.

Figure 4:
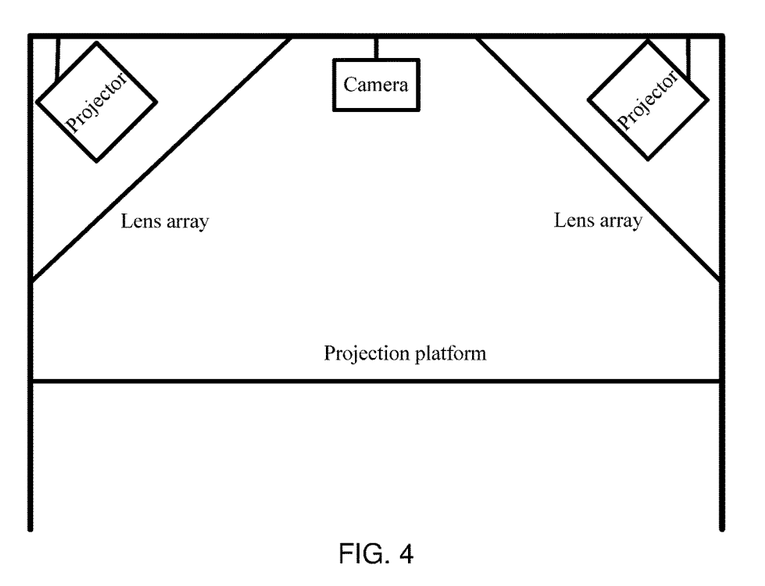
FIG. 4 is a schematic diagram of an application scenario of a light field illuminating system according to an embodiment of the present invention.

FIG. 4 is a schematic diagram of an application scenario of a light field illuminating system according to an embodiment of the present invention. Please refer to FIG. 4, further, in order to achieve light field illumination with a wider range of angles, the projector 10 can be multiple, each projector 10 and a set of lens array 20 are used cooperatively to form a separate light field illuminating system. Two sets of light field illuminating systems cover the same illuminating range so as to achieve multi-angle lighting control and recovery (taking only two projectors as an example in FIG. 4). When multiple projectors are adopted to perform light field illumination, the light field illuminating method further includes: performing brightness mapping on projection input images and projection light field output of the multiple projectors, and determining that brightness of the projection rays output to the illuminating light field are consistent by generating the projection input images of the multiple projectors through the mapping.

Further, in order to obtain a vivid image rendering effect, the method further includes:

extracting image data of the target object obtained after performing the light field illumination on the target object with the projection input image, and merging the image data and image data of the sampled scene to obtain a lighting rendering result of the target object under the sampled scene.

In particular, take a picture of the target object when performing illumination with the projection input image, obtain image data of the target object under illumination with the projection input image, merge the obtained image data and the image data of the sampled scene by means of an image processing software, and then obtain the lighting rendering result of the target object under the sampled scene.

Figure 5:
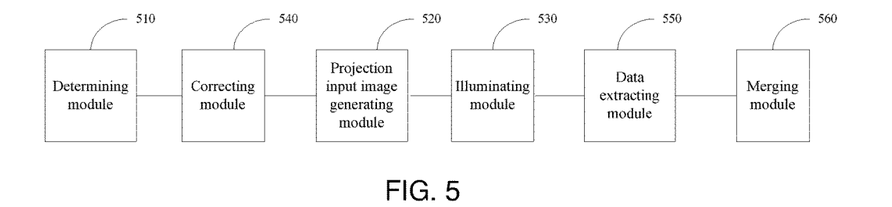
FIG. 5 is a structural block diagram of a light field illuminating device according to an embodiment of the present invention.

An embodiment of the present invention further provides a light field illuminating device. FIG. 5 is a structural block diagram of a light field illuminating device according to an embodiment of the present invention, please refer to FIG. 5, the device includes:

a determining module 510, configured to determine, based on a position and an angle of rays emitted from a projector as well as a focal length of lens, a position and an angle of projection rays obtained after the emitted rays being transmitted through a lens array;

the determining module 510 is further configured to determine, based on the position and the angle of the projection rays as well as a light probe array of a sampled scene, a brightness value of the projection rays;

a projection input image generating module 520, configured to convert, based on a brightness transfer function of the projector, the brightness value of the projection rays into a pixel value of a projection input image, and generate the projection input image based on the pixel value of the projection input image; and an illuminating module 530, configured to perform light field illumination on a target object with the projection input image.

In the light field illuminating device provided in the embodiment of the present invention, the brightness value of the projection rays is determined based on the position and the angle of the projection rays of the projector as well as the light probe array of the sampled scene; the brightness value of the projection rays is converted into the pixel value of the projection input image based on the brightness transfer function of the projector, thereby generating the projection input image; and the light field illumination is performed on the target object with the projection input image. The present invention can achieve accurate lighting recovery of the sampled scene by collecting the light probe array of the sampled scene in combination with the position and the angle of the projection rays. And the projector and the lens array are adopted in the present invention to achieve light field illumination, so that pixel-level accurate lighting control can be achieved, and various complicated light field environments can be simulated vividly in practical scenario.

The determining module 510 is further configured to determine, based on a light probe array of a set projection image, a position of a dot light source, where the dot light source is formed after the rays emitted from the projector being refocused through the lens;

Further, in the process of determining the position and the angle of the projection rays, in order to eliminate the effects on the ray transfer matrix caused by model distortion and equipment error and guarantee the accuracy of the position and the angle of the projection rays, the device further includes: a correcting module 540, configured to correct, based on the position of the dot light source, the position and the angle of the projection rays;

the determining module 510 is specifically configured to determine, based on the corrected position and the corrected angle of the projection rays as well as the light probe array of the sampled scene, the brightness value of the projection rays.

The determining module 510 is specifically configured to determine the position and the angle of the projection rays based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ -\frac{1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

where, $x_p$ indicates the position of the rays emitted from the projector, $v_p$ indicates the angle of the rays emitted from the projector, $f_l$ indicates the focal length of the lens, h1 indicates the vertical ray transmission distance from the projector to the lens, h2 indicates the vertical ray transmission distance from the lens to the projection plane; z indicates the position of the dot light source, $x_l$ indicates the position of the projection rays of the projector, and $v_l$ indicates the angle of the projection rays of the projector.

Further, in order to obtain a vivid image rendering effect, the method further includes:

a data extracting module 550, configured to extract illuminating data obtained after performing the light field illumination on the target object with the projection input image, and a merging module 560, configured to merge the illuminating data and image data of the sampled scene to obtain a lighting rendering result of the target object under the sampled scene.

In particular, functions of the determining module 510, the projection input image generating module 520 and the correcting module 540 can be performed by a processor provided within a computer or other electronic devices, the function of the illuminating module 530 can be performed by the projector 10, the function of the data extracting module 550 can be performed by a camera, and the function of the merging module 560 can be performed by an image processing software operated by the processor.

The light field illuminating device provided in the device embodiment of the present invention is used to perform the technical solutions provided in the above method embodiment, implementation principles and technical effects thereof are similar, and no further details will be given.

Figure 6:
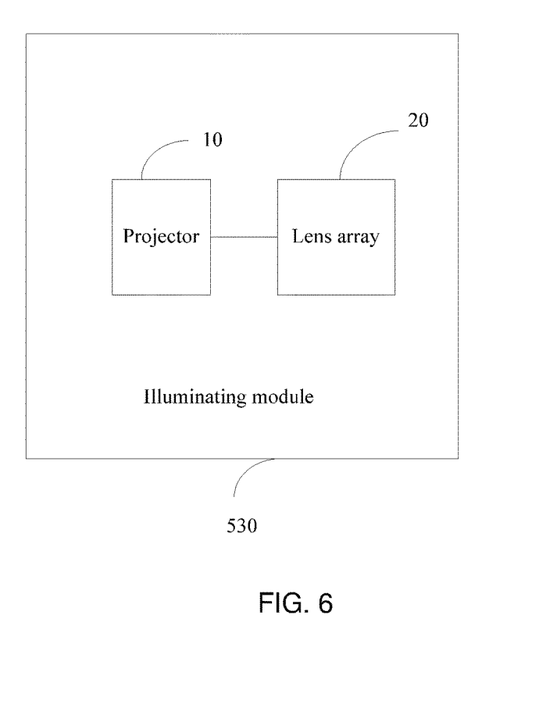
FIG. 6 is a structural block diagram of a light field illuminating system according to an embodiment of the present invention.

An embodiment of the present invention further provides a light field illuminating system. FIG. 6 is a structural block diagram of a light field illuminating system according to an embodiment of the present invention. Please refer to FIG. 6, the light field illuminating system includes a projector 10, a lens array 20, and the light field illuminating device 500 described in the above embodiments.

Finally, it should be noted that the above embodiments are merely used for describing the technical solutions of the present invention, but not intended to limit the present invention. Although the present invention has been described in detail with reference to the foregoing embodiments, it should be understood that persons skilled in the art can make modifications to the technical solutions recited in the foregoing embodiments or make equivalent substitutions of a part of technical features or all of the technical features thereof, and these modifications or substitutions do not make the essence of their corresponding technical solutions depart from the scope of the technical solutions of the embodiments of the invention.

The invention claimed is:

1. A light field illuminating method, comprising:
   determining, based on a first position and a first exit angle of rays emitted from a projector as well as a focal length of a lens of a lens array, a second position and a second exit angle of projection rays obtained after the emitted rays being transmitted through the lens array; wherein the rays emitted from the projector exit out of the projector at the first position with the first exit angle, and the projection rays exit out of the lens array at the second position with the second exit angle;
   determining, based on the second position and the second exit angle of the projection rays as well as a light probe array of a sampled scene, a brightness value of the projection rays;
   converting, based on a brightness transfer function of the projector, the brightness value of the projection rays into a pixel value of a projection input image, generating the projection input image based on the pixel value of the projection input image; and
   performing light field illumination on a target object with the projection input image.

2. The method according to claim 1, wherein, before determining, based on the second position and the second exit angle of the projection rays as well as the light probe array of the sampled scene, the brightness value of the projection rays, the method further comprises:
   determining, based on a light probe array of a set projection image, a position of a dot light source, wherein the dot light source is formed after the rays emitted from the projector being refocused through the lens; and
   correcting, based on the position of the dot light source, the second position and the second exit angle of the projection rays;
   wherein the determining, based on the second position and the second exit angle of the projection rays as well as the light probe array of the sampled scene, the brightness value of the projection rays, comprises:
   determining, based on the corrected second position and the corrected second exit angle of the projection rays as well as the light probe array of the sampled scene, the brightness value of the projection rays.

3. The method according to claim 2, wherein, the correcting, based on the position of the dot light source, the second position and the second exit angle of the projection rays, comprises:
   determining the second position and the second exit angle of the projection rays based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ -\frac{1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

wherein, $x_p$ indicates the first position of the rays emitted from the projector, $v_p$ indicates the first exit angle of the rays emitted from the projector, $f_1$ indicates the focal length of the lens, $h_1$ indicates a vertical ray transmission distance from the projector to the lens, $h_2$ indicates a vertical ray transmission distance from the lens to a projection plane; z indicates the position of the dot light source, $x_1$ indicates the second position of the projection rays of the projector, and $v_1$ indicates the second exit angle of the projection rays of the projector.

4. The method according to claim 2, wherein, there are multiple projectors, and the method further comprises: determining that brightness of projection rays output to the target object are consistent by controlling the projection input images of the multiple projectors.

5. The method according to claim 1, further comprising: extracting illuminating data obtained after performing the light field illumination on the target object with the projection input image, and merging the illuminating data and image data of the sampled scene to obtain a lighting rendering result of the target object under the sampled scene.

6. A light field illuminating device, comprising:
a determining module, configured to determine, based on a first position and first exit angle of rays emitted from a projector as well as a focal length of lens of a lens array, a second position and second exit angle of projection rays obtained after the emitted rays being transmitted through the lens array; wherein the rays emitted from the projector exit out of the projector at the first position with the first exit angle, and the projection rays exit out of the lens array at the second position with the second exit angle;
wherein, the determining module is further configured to determine, based on the second position and the second exit angle of the projection rays as well as a light probe array of a sampled scene, a brightness value of the projection rays;
a projection input image generating module, configured to convert, based on a brightness transfer function, the brightness value of the projection rays into a pixel value of a projection input image, and generate the projection input image based on the pixel value of the projection input image; and
an illuminating module, configured to perform light field illumination on a target object with the projection input image.

7. The device according to claim 6, wherein,
the determining module is further configured to determine, based on a light probe array of a set projection image, a position of a dot light source, wherein the dot light source is formed after the rays emitted from the projector being refocused through the lens;
the device further comprises: a correcting module, configured to correct, based on the position of the dot light source, the second position and the second exit angle of the projection rays;
the determining module is specifically configured to determine, based on the corrected second position and the corrected second exit angle of the projection rays as well as the light probe array of the sampled scene, the brightness value of the projection rays.

8. The device according to claim 7, wherein, the determining module is specifically configured to determine the second position and the second exit angle of the projection rays based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ -\frac{1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

wherein, $x_p$ indicates the first position of the rays emitted from the projector, $v_p$ indicates the first exit angle of the rays emitted from the projector, $f_1$ indicates the focal length of the lens, $h_1$ indicates a vertical ray transmission distance from the projector to the lens, $h_2$ indicates a vertical ray transmission distance from the lens to a projection plane; z indicates the position of the dot light source, $x_l$ indicates the second position of the projection rays of the projector, and $v_1$ indicates the second exit angle of the projection rays of the projector.

9. The device according to claim 6, further comprising:
a data extracting module, configured to extract illuminating data obtained after performing the light field illumination on the target object with the projection input image, and
a merging module, configured to merge the illuminating data and image data of the sampled scene to obtain a lighting rendering result of the target object under the sampled scene.

10. A light field illuminating system, comprising a projector, a lens array, and a light field illuminating device according to claim 6.

11. The system according to claim 10, wherein,
the determining module is further configured to determine, based on a light probe array of a set projection image, a position of a dot light source, wherein the dot light source is formed after the rays emitted from the projector being refocused through the lens;
the light field illuminating device further comprises: a correcting module, configured to correct, based on the position of the dot light source, the second position and the second exit angle of the projection rays;
the determining module is specifically configured to determine, based on the corrected second position and the corrected second exit angle of the projection rays as well as the light probe array of the sampled scene, the brightness value of the projection rays.

12. The system according to claim 11, wherein, the determining module is specifically configured to determine the second position and the second exit angle of the projection rays based on $$\begin{bmatrix} x_l \\ v_l \end{bmatrix} = \begin{bmatrix} 1 & h_1 \\ 0 & 1 \end{bmatrix} \begin{bmatrix} 1 & 0 \\ -\frac{1}{f_l} & \frac{z}{f_l \cdot v_p} \end{bmatrix} \begin{bmatrix} 1 & h_2 \\ 0 & 1 \end{bmatrix} \begin{bmatrix} x_p \\ v_p \end{bmatrix};$$

wherein, $x_p$ indicates the first position of the rays emitted from the projector, $v_p$ indicates the first exit angle of the rays emitted from the projector, $f_1$ indicates the focal length of the lens, $h_1$ indicates a vertical ray transmission distance from the projector to the lens, $h_2$ indicates a vertical ray transmission distance from the lens to a projection plane; z indicates the position of the dot light source, $x_1$ indicates the second position of the projection rays of the projector, and $v_1$ indicates the second exit angle of the projection rays of the projector.

13. The system according to claim 10, wherein the light field illuminating device further comprises:

a data extracting module, configured to extract illuminating data obtained after performing the light field illumination on the target object with the projection input image, and a merging module, configured to merge the illuminating data and image data of the sampled scene to obtain a lighting rendering result of the target object under the sampled scene.

* * * * *